United States Patent
Takahashi et al.

(10) Patent No.: US 12,497,476 B2
(45) Date of Patent: Dec. 16, 2025

(54) ANTIBACTERIAL POLYMER PARTICLES, COMPOSITION, AND ARTICLE

(71) Applicant: GC Corporation, Shizuoka (JP)

(72) Inventors: Makoto Takahashi, Tokyo (JP); Tomoki Kono, Tokyo (JP); Azusa Miyagawa, Tokyo (JP); Yuri Fukuyo, Tokyo (JP)

(73) Assignee: GC Corporation, Shizuoka (JP)

( * ) Notice: Subject to any disclaimer, the term of this patent is extended or adjusted under 35 U.S.C. 154(b) by 518 days.

(21) Appl. No.: 17/596,592

(22) PCT Filed: Jun. 29, 2020

(86) PCT No.: PCT/JP2020/025572
§ 371 (c)(1),
(2) Date: Dec. 14, 2021

(87) PCT Pub. No.: WO2021/010154
PCT Pub. Date: Jan. 21, 2021

(65) Prior Publication Data
US 2022/0298280 A1    Sep. 22, 2022

(30) Foreign Application Priority Data
Jul. 12, 2019   (JP) ................................ 2019-130228

(51) Int. Cl.
| | |
|---|---|
| *C08F 220/34* | (2006.01) |
| *A61K 6/17* | (2020.01) |
| *A61K 6/69* | (2020.01) |
| *A61K 6/887* | (2020.01) |

(52) U.S. Cl.
CPC ............. *C08F 220/34* (2013.01); *A61K 6/69* (2020.01); *A61K 6/887* (2020.01); *A61K 6/17* (2020.01)

(58) Field of Classification Search
CPC .................................................. A61K 6/887
See application file for complete search history.

(56) References Cited

U.S. PATENT DOCUMENTS

| | | | |
|---|---|---|---|
| 5,408,022 A * | 4/1995 | Imazato | ................. A01N 25/10 526/265 |
| 5,624,963 A | 4/1997 | Mandeville, III et al. | |
| 2003/0064102 A1 | 4/2003 | Nakatsuka | |
| 2004/0227985 A1 * | 11/2004 | Kishi | ...................... G02F 1/167 359/296 |
| 2010/0035791 A1 | 2/2010 | Igarashi et al. | |
| 2011/0306742 A1 * | 12/2011 | Farrand | ................. C08F 220/14 526/219.1 |
| 2016/0297911 A1 | 10/2016 | Niitani et al. | |

FOREIGN PATENT DOCUMENTS

| | | |
|---|---|---|
| CN | 105793304 | 7/2016 |
| JP | H08-092020 | 4/1996 |
| JP | H10-25218 | 1/1998 |
| JP | H10-025218 | 1/1998 |
| JP | H10-501264 | 2/1998 |
| JP | H10-197831 | 7/1998 |
| JP | H10-203005 | 8/1998 |
| JP | 2005-060668 | 3/2005 |
| JP | 2007-327008 | 12/2007 |
| JP | 2008-111219 | 5/2008 |
| WO | 2018/165584 | 9/2018 |

OTHER PUBLICATIONS

Rivas* Bernabé L., "Poly[3-(Methacryloylamino)Propyl]Trimethylammonium Chloride Hydrogel. Synthesis and Water-Absorption Capacity.", Bol. Soc. Chil. Quím. vol.45 n.2 Concepción Jun. 2000, Jun. 30, 2000 (Jun. 30, 2000), pp. 1-5, XP093057902, Retrieved from the Internet: URL: https://www.scielo.cl/scielo.php?script=sci_arttext&pid=S0366-16442000000200015&Ing=en&nrm=iso&tlng=en, [retrieved on Jun. 26, 2023], * Experimental part; figure 5; tables I-III *.

Hamid Reza Norouzi et al.: "Equilibrium Swelling Study of Cationic Acrylamide-Based Hydrogels: Effect of Synthesis Parameters, and Phase Transition in Polyelectrolyte Solutions", Journal of Chemical and Petroleum Engineering, Dec. 1, 2011 (Dec. 1, 2011), pp. 13-25, XP093057923, DOI:10.22059/JCHPE.2011.23478 Retrieved from the Internet: URL: https://jchpe.ut.ac.ir/article_23478_ccb42d66bc9e7a165562a02268447238.pdf [retrieved on Jun. 26, 2023].

International Search Report for PCT/JP2020/025572 mailed on Sep. 15, 2020.

* cited by examiner

*Primary Examiner* — Michael F Pepitone
(74) *Attorney, Agent, or Firm* — IPUSA, PLLC

(57) ABSTRACT

One aspect of the present invention includes, in antibacterial polymer particles, a crosslinked copolymer having a structural unit derived from a monofunctional monomer having an antibacterial group, and a structural unit derived from a polyfunctional monomer. A water absorption capacity of the antibacterial polymer particles is 3 g/g or more.

7 Claims, No Drawings

ANTIBACTERIAL POLYMER PARTICLES, COMPOSITION, AND ARTICLE

CROSS-REFERENCE TO RELATED APPLICATIONS

The present application is a national stage application of International Application No. PCT/JP2020/025572, filed Jun. 29, 2020, which claims priority to Japanese patent application No. 2019-130228, filed Jul. 12, 2019. The contents of Japanese patent application No. 2019-130228 are incorporated herein by reference.

TECHNICAL FIELD

The present invention relates to antibacterial polymer particles, composition including the antibacterial polymer particles, and an article including the antibacterial polymer particles.

BACKGROUND ART

In the field of dentistry, antibacterial agents are added in order to impart antibacterial activity to a dental composition such as a dental composite resin.

Patent Literature 1 discloses an antibacterial inorganic filler in which the surface of the filler is coated with a polymer obtained by polymerizing polymerizable monomers including at least one antibacterial polymerizable monomer selected from compounds represented by a specific structural formula.

CITATION LIST

Patent Literature

[PTL 1]
Japanese Laid-Open Patent Publication No. H10-25218

SUMMARY OF INVENTION

Technical Problem

However, there is a problem that an antibacterial activity and a durability of the antibacterial activity are not sufficient.

One aspect of the present invention is to provide antibacterial polymer particles having high antibacterial activity and high durability of the antibacterial activity.

Solution to Problem

One aspect of the present invention is: antibacterial polymer particles comprising; a crosslinked copolymer that includes a structural unit derived from a monofunctional monomer having an antibacterial group, and a structural unit derived from a polyfunctional monomer; wherein a water absorption capacity of the antibacterial polymer particles is 3 g/g or more.

Advantageous Effects of Invention

According to one aspect of the present invention, antibacterial polymer particles having high antibacterial activity and high durability of the antibacterial activity can be provided.

DESCRIPTION OF EMBODIMENTS

In the following, embodiments of the present invention will be described.

[Antibacterial Polymer Particles]

The antibacterial polymer particles of the present embodiment include a crosslinked copolymer having a structural unit derived from a monofunctional monomer having an antibacterial group, and a structural unit derived from a polyfunctional monomer.

The term "monofunctional monomer" means a monomer having one polymerizable group, and the term "polyfunctional monomer" means a monomer having two or more polymerizable groups.

Examples of the polymerizable group include vinyl groups, methacryloyl groups, acryloyl groups, and the like.

When synthesizing the antibacterial polymer particles, if only a polyfunctional monomer having the antibacterial group is used as a monomer having the antibacterial group, the antibacterial activity of the antibacterial polymer particles is reduced because the antibacterial group is confined by a crosslinked structure of the crosslinked copolymer.

Further, when synthesizing the antibacterial polymer particles, if the monofunctional monomer having the antibacterial group is used, and the other monomer, that is, the polyfunctional monomer is not used, the durability of the antibacterial activity of the antibacterial polymer particles is reduced because the antibacterial polymer particles is composed of non-crosslinked copolymers.

A water absorption capacity of the antibacterial polymer particles of the present embodiment is 3 g/g or more, and preferably 5 g/g or more. When the water absorption capacity of the antibacterial polymer particles is less than 3 g/g, the antibacterial activity of the antibacterial polymer particles is reduced.

The water absorption capacity of the antibacterial polymer particles of the present embodiment is preferably 150 g/g or less, and more preferably 105 g/g or less. When antibacterial polymer particles of the present embodiment having a water absorption capacity of 150 g/g or less are fixed to the surface of an article, the article becomes tough and the appearance is improved.

The term "polymer particles" means particles of polymer, and do not includes, for example, inorganic particles whose surfaces are coated with a polymer.

The monofunctional monomer having the antibacterial group includes one or more antibacterial group(s).

Examples of the antibacterial group include cationic groups such as quaternary ammonium bases, and biguanide groups. Among these, the quaternary ammonium bases is preferable from the viewpoint of antibacterial activity.

The monofunctional monomer having the antibacterial group is preferably a compound represented by the general formula:

[Chemical 1]

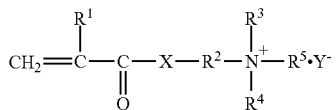

($R^1$ is a methyl group or a hydrogen atom, X is an oxygen atom or an imino group, $R^2$ is an alkylene group having 1 to 20 carbon atoms, and $R^3$ and $R^4$ are independently alkyl groups having 1 to 3 carbon atoms, $R^5$ is an alkyl group having 1 to 20 carbon atoms, and $Y^-$ is a chloride ion, an iodide ion, a bromide ion, or a methyl sulfate ion.)

Specific examples of the monofunctional monomer having the antibacterial group include 3-(methacrylamide) pro- Examples of the polyfunctional monomer having the antibacterial group include compounds represented by chemical formulae (3) and (4).

[Chemical 3]

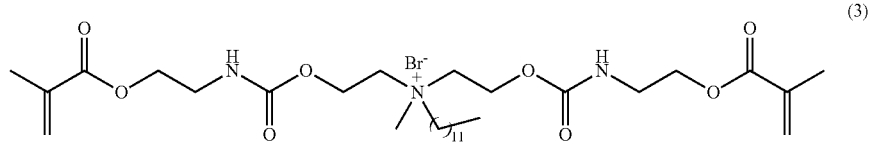

(3)

[Chemical 4]

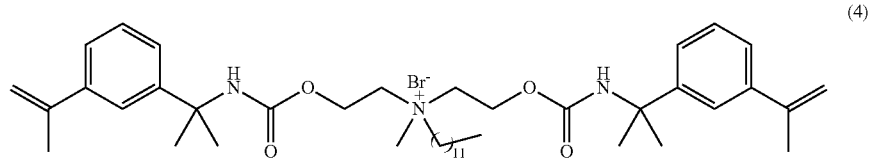

(4)

pyltrimethylammonium chloride, 3-(methacrylamide) propyltrimethylammonium methyl sulfate, 2-(methacryloyloxy) ethyltrimethylammonium chloride, and 2-(methacryloyloxy) ethyltrimethylammonium methylsulfate.

Specific examples of the monofunctional monomer having the antibacterial group other than the above include, for example, a compound represented by the chemical formula (2).

[Chemical 2]

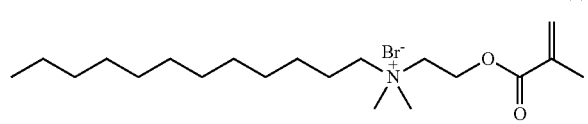

(2)

The compound represented by the chemical formula (2) can be synthesized, for example, as follows.

First, 1-bromododecane and 2-(dimethylamino) ethyl methacrylate are weighed, dissolved in ethanol, and then heated to reflux. The solvent is then removed by vacuum concentration and then the remaining solid is dried using a vacuum pump to give a white foamy crude product. Next, the crude product is washed with hexane to obtain the compound represented by the chemical formula (2).

The polyfunctional monomer may or may not include an antibacterial group.

Examples of the polyfunctional monomer having no antibacterial groups include diethylene glycol dimethacrylate, triethylene glycol dimethacrylate, neopentyl glycol dimethacrylate, tricyclodecanedimethanol dimethacrylate, urethane dimethacrylate (UDMA), and bisphenol A diglycidyl methacrylate (Bis-GMA), ethoxylated bisphenol A dimethacrylate, 1,6-hexanediol dimethacrylate, trimethylolpropane trimethacrylate, glycerin dimethacrylate and the like.

The polyfunctional monomer having the antibacterial group has one or more antibacterial groups.

Examples of the antibacterial group include cationic groups such as quaternary ammonium bases, and biguanide groups. Among these, quaternary ammonium bases are preferable from the viewpoint of antibacterial activity.

The compound represented by the chemical formula (3) can be synthesized, for example, by the following steps 1 and 2.

(Step 1)

Under a stream of argon, 1-bromododecane is added to dehydrated acetone, then N-methyldiethanolamine is added, the temperature is raised, and the mixture is stirred. Next, the product is allowed to cool and then vacuum concentration (concentration to dryness) is performed to obtain a residue. Next, after adding diethyl ether to the residue, the mixture is stirred to obtain a solid. The solid is then suspended and washed twice with diethyl ether and then the mixture is dried to give N,N-bis(2-hydroxyethyl)-N-methyldodecylammonium bromide.

(Step 2)

Under a stream of argon, N,N-bis(2-hydroxyethyl)-N-methyldodecylammonium bromide and 2-isocyanatoethyl methacrylate are added to dehydrated acetone, then the mixture is stirred at room temperature to obtain a suspension. Next, using a Pasteur pipette, dibutyltin dilaurate is added to the suspension, the temperature is raised, and the mixture is stirred. Next, the product is allowed to cool and then vacuum concentration (concentration to dryness) is performed to obtain an oily residue. Next, after adding heptane to the residue, operations of stirring and discarding the supernatant are carried out with an evaporator. Next, after adding diethyl ether, the operations of stirring and discarding the supernatant are carried out with an evaporator. Next, acetone is added and the residue is dissolved in the acetone. Vacuum concentration is performed to obtain a compound represented by the chemical formula (3).

The compound represented by the chemical formula (4) can be synthesized, for example, as follows.

Under a stream of argon, N,N-bis (2-hydroxyethyl)-N-methyldodecylammonium bromide, and 3-isopropenyl-α,α-dimethylbenzylisocyanate are added to dehydrated acetone, and then the mixture is stirred at room temperature to obtain a suspension. Next, using a Pasteur pipette, dibutyltin dilaurate is added to the suspension, and the mixture is stirred while being heated. Next, the product is allowed to cool and then vacuum concentration (concentration to dryness) is performed to obtain an oily residue. Next, after adding diethyl ether to the residue, operations of stirring and discarding the supernatant are carried out with an evaporator. Next, after adding heptane, the operations of stirring and discarding the supernatant are carried out with an evaporator. Next, after adding diethyl ether, the operations of stirring and discarding the supernatant are carried out with an evaporator, then vacuum concentration is performed to obtain a compound represented by the chemical formula (4).

The crosslinked copolymer may further include a structural unit derived from the monofunctional monomer having no antibacterial groups.

Examples of the monofunctional monomer having no antibacterial groups include methoxypolyethylene glycol #400 methacrylate, phenoxyethylene glycol methacrylate, 2-methacryloyloxyethyl succinate and the like.

A median diameter of the antibacterial polymer particles of the present embodiment is preferably 0.2 to 110 µm, and more preferably 0.5 to 80 µm. When the median diameter of the antibacterial polymer particles of the present embodiment is 0.2 µm or more, the antibacterial activity of the antibacterial polymer particles of the present embodiment is further improved, and when the median diameter of the antibacterial polymer particles of the present embodiment is 110 µm or less, the durability of the antibacterial activity of the antibacterial polymer particles of the present embodiment is further improved.

[Method For Producing Antibacterial Polymer Particles]

The method for producing the antibacterial polymer particles of the present embodiment includes, for example, a step of solution polymerization of the monofunctional monomer having the antibacterial group and a monomer composition containing the polyfunctional monomer in the presence of a polymerization initiator. As a result, the antibacterial polymer particles including the crosslinked copolymer having the structural unit derived from the monofunctional monomer having the antibacterial group and the structural unit derived from the polyfunctional monomer can be obtained.

The content of the monofunctional monomer having the antibacterial group in the monomer composition is preferably 5 to 99% by mass, and more preferably 10 to 95% by mass. When the content of the monofunctional monomer having the antibacterial group in the monomer composition is 5% by mass or more, the antibacterial activity of the antibacterial polymer particles of the present embodiment is improved, and when the content of the monofunctional monomer having the antibacterial group in the monomer composition is 99% by mass or less, the durability of the antibacterial activity of the present embodiment is improved.

The content of the polyfunctional monomer in the monomer composition is preferably 1 to 95% by mass, and more preferably 5 to 90% by mass. When the content of the polyfunctional monomer in the monomer composition is 1% by mass or more, the durability of the antibacterial activity of the antibacterial polymer particles of the present embodiment is improved, and when the content of the polyfunctional monomer in the monomer composition is 95% by mass or less, the antibacterial activity of the antibacterial polymer of the present embodiment is improved.

Examples of the polymerization initiator include organic peroxides, and azo compounds.

Examples of the solvent used for the solution polymerization include ethanol, methanol, acetone, benzene, methyl acetate, ethyl acetate, toluene, hexane, water and the like.

The monomer composition may be polymerized by a polymerization method other than the solution polymerization method.

Examples of polymerization methods other than the solution polymerization include dispersion polymerization, suspension polymerization, and emulsion polymerization.

[Usage and Application of Antibacterial Polymer Particles]

When the antibacterial polymer particles of the present embodiment are fixed to the surface of the article, antibacterial property is imparted to the surface of the article.

Examples of articles in which the antibacterial polymer particles of the present embodiment are fixed on the surface include, for example, dental products such as restorations such as prostheses, impressions, and denture bases, medical supplies such as contact lenses, catheters, implants, wound dressings, and stents, and daily necessities such as antibacterial sheets, cutting boards, toilet seats, and tableware.

The method for producing an article in which the antibacterial polymer particles of the present embodiment are fixed to the surface includes, for example, a step of forming a composition including the antibacterial polymer particles of the present embodiment.

Examples of the composition including the antibacterial polymer particles of the present embodiment include dental composite resin, dental bonding material, dental coating agent, dental cement, dental impression material, denture base material and the like.

[Dental Composite Resin]

A dental composite resin of the present embodiment preferably includes, in addition to the antibacterial polymer particles of the present embodiment, an acid-group-containing (meth)acrylate, a (meth)acrylate having no acid group, a polymerization initiator, and a filler.

(Acid-Group-Containing (Meth)Acrylate)

In the present description and claims, the term "(meth)acrylate" means compounds having one or more methacryloyloxy groups and/or acryloyloxy groups (hereinafter referred to as (meth)acryloyloxy groups), e.g., monomer, oligomer, prepolymer, and the like.

The acid-group-containing (meth)acrylate preferably has one or more phosphoric acid group, thiophosphate group, or carboxyl group.

Examples of (meth)acrylates having one or more phosphoric acid groups include 2-(meth)acryloyloxyethyl dihydrogenphosphate, bis [2-(meth)acryloyloxyethyl] hydrogen phosphate, and 2-(meth)acryloyloxyethyl phenylhydrogen phosphate, 6-(meth)acryloyloxyhexyl dihydrogen phosphate, 6-(meth)acryloyloxyhexyl phenylhydrogen phosphate, 10-(meth)acryloyloxydecyl dihydrogen phosphate, 1,3-di(meth)acryloyl propane-2-dihydrogen phosphate, 1,3-di(meth)acryloyl propane-2-phenylhydrogen phosphate, bis [5-{2-(meth)acryloyloxyethoxycarbonyl}heptyl]hydrogen phosphate, and the like.

Examples of (meth)acrylates having one or more thiophosphate groups include 2-(meth)acryloyloxyethyl dihydrogenthiophosphate, 3-(meth)acryloyloxypropyl dihydrogenthiophosphate, 4-(meth)acryloyloxybutyl dihydrogenthiophosphate, 5-(meth)acryloyloxypentyl dihydrogenthiophosphate, 6-(meth)acryloyloxyhexyl dihydrogenthiophosphate, 7-(meth)acryloyloxyheptyl dihydrogenthiophosphate, 8-(meth)acryloyloxyoctyl dihydrogenthiophosphate, 9-(meth)acryloyloxynonyl dihydrogenthiophosphate, 10-(meth)acryloyloxydecyl dihydrogenthiophosphate, 11-(meth)acryloyloxyundecyl dihydrogenthiophosphate, 12-(meth)acryloyloxidodecyl dihydrogenthiophosphate, 13-(meth)acryloyloxytridecyl dihydrogenthiophosphate, 14-(meth)acryloyloxytetradecyl dihydrogenthiophosphate, 15-(meth)acryloyloxypentadecyl dihydrogenthiophosphate, 16-(meth)acryloyloxyhexadecyl dihydrogenthiophosphate, 17-(meth)acryloyloxyheptadecyl dihydrogenthiophosphate, 18-(meth)acryloyloxyoctadecyl dihydrogenthiophosphate, 19-(meth)acryloyloxynonadecyl dihydrogenthiophosphate, 20-(meth)acryloyloxyicosyl dihydrogenthiophosphate, and the like.

Examples of (meth)acrylates having one or more carboxyl groups include 4-(meth)acryloyloxyethyl trimellitic acid, 4-(meth)acryloyloxyethyl trimellitic acid anhydride, 4-(meth)acryloyloxydecyl trimellitic acid, 4-(meth)acryloyloxydecyl trimellitic acid anhydride, 11-(meth)acryloyloxy-1,1-undecane dicarboxylic acid, 1,4-di(meth)acryloyloxy pyromellitic acid, 2-(meth)acryloyloxyethyl maleic acid, 2-(meth)acryloyloxyethyl phthalic acid, 2-(meth)acryloyloxyethyl hexahydrophthalic acid, and the like.

Two or more of the above acid-group-containing (meth) acrylates may be used in combination.

The acid-group-containing (meth)acrylate preferably has two or more (meth)acryloyloxy groups. When the acid-group-containing (meth)acrylate has two or more (meth) acryloyloxy groups, the strength of the surface of the repaired portion is further improved.

The content of the acid-group-containing (meth)acrylate in the dental composite resin of the present embodiment is preferably 1 to 30% by mass, and more preferably 3 to 20% by mass.

((Meth)Acrylate Having No Acid Group)

Examples of (meth)acrylates having no acid group include methyl (meth)acrylate, ethyl (meth)acrylate, isopropyl (meth)acrylate, n-butyl (meth)acrylate, isobutyl (meth) acrylate, hydroxypropyl (meth)acrylate, tetrahydrofurfuryl (meth)acrylate, glycidyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-methylhexyl (meth) acrylate, 2-ethylhexyl (meth)acrylate, benzyl (meth) acrylate, 2-hydroxy-1,3-di(meth)acryloyloxy propane, ethylene glycol di(meth)acrylate, diethylene glycol di(meth) acrylate, triethylene glycol di(meth)acrylate, butylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, trimethylolpropane tri (meth)acrylate, trimethylolethane tri(meth)acrylate, pentaerythritol tri(meth)acrylate, trimethylolmethane (meth) acrylate, pentaerythritol tetra (meth)acrylate, polybutyleneglycol di(meth)acrylate, bisphenol A diglycidyl (meth) acrylate, di-2-(meth)acryloyloxyethyl-2,2,4-trimethylhexamethylene dicarbamate, 1,3,5-Tris[1,3-bis{(meth)acryloyloxy}-2-propoxycarbonylaminohexane]-1,3,5-(1H,3H,5H)triazine-2,4,6-trione, 2,2-bis[4-(3-(meth) acryloyloxy-2-hydroxypropyl)]phenylpropane, N,N'-(2,2,4-trimethylhexamethylene)bis[2-(aminocarboxy)propane-1,3-diol]tetramethacrylate, a (meth)acrylate of urethane oligomer including 2,2'-bis(4-hydroxycyclohexyl)propane, 2-oxypanone, hexamethylene diisocyanate, and 2-hydroxyethyl(meth)acrylate, a (meth)acrylate of urethane oligomer including 1,3-butanediol, hexamethylene diisocyanate, and 2-hydroxyethyl (meth)acrylate, and the like.

The (meth)acrylate having no acid group preferably has two or more (meth)acryloyloxy groups. When the (meth) acrylate having no acid group has two or more (meth) acryloyloxy groups, the strength of the surface of the repaired portion is further improved.

The content of the (meth)acrylate having no acid group in the dental composite resin of the present embodiment is preferably 0.5 to 90% by mass, and more preferably 10 to 60% by mass.

(Polymerization Initiator)

As the polymerization initiator, a chemical polymerization initiator, and/or a photopolymerization initiator may be used.

The chemical polymerization initiator includes an oxidizing agent, and a reducing agent.

Examples of the oxidizing agent included in the chemical polymerization initiator include peroxides such as cumene hydroperoxide, diisopropylbenzene hydroperoxide, di-t-butyl peroxide, lauroyl peroxide, benzoyl peroxide, t-butylperoxy isopropyl carbonate, t-butylperoxy-2-ethylhexanoate, azo compounds such as azobis(isobutyronitrile), 1,1'-azobis (cyclohexanecarbonitrile), 2,2'-azobis(2,4-dimethylvaleronitrile), dimethyl 2,2'-azobis(2-methylpropionate), hydrogen peroxide, peroxide, and the like.

Two or more of the above oxidizing agents may be used in combination.

The content of the oxidizing agent in the dental composite resin of the present embodiment is preferably 0.001 to 10% by mass, and more preferably 0.01 to 5% by mass.

As the reducing agent included in the chemical polymerization initiator, amine compounds, sulfinic acids, thioureas, cysteines, ascorbic acids, and the like, can be used.

Examples of the amine compounds include amine compounds such as N,N-dimethyl-p-toluidine, N,N-diethyl-p-toluidine, N, N-dimethylaniline, N,N-bis(2-hydroxyethyl)-p-toluidine, N,N-dimethylaminoethyl methacrylate, triethanolamine, methyl 4-dimethylaminobenzoate, ethyl 4-dimethylaminobenzoate, isoamyl 4-dimethylaminobenzoate, triethylamine, N-ethyldiethanolamine, triethanolamine, and N-phenylglycine, and the like.

Examples of the sulfinic acids include sodium p-toluenesulfinate, lithium p-toluenesulfinate, benzenesulfinic acid, sodium benzenesulfinate, p-toluenesulfonyl chloride, p-toluenesulfonylfluoride, o-toluenesulfonyl isocyanate, sodium p-acetamidebenzenesulfinate, and the like.

Examples of the thioureas include thiourea, ethylene thiourea, N-methylthiourea, N-ethylthiourea, N-propylthiourea, N-butylthiourea, N-lauryl thiourea, N-phenylthiourea, N-cyclohexylthiourea, N,N-dimethylthiourea, N,N-diethylthiourea, N,N-dipropylthiourea, N,N-dibutylthiourea, N,N-dilauryl thiourea, N,N-diphenylthiourea, N,N-dicyclohexylthiourea, trimethylthiourea, tetramethyl thiourea, N-acetylthiourea, N-benzoyl thiourea, 1-allyl-3-(2-hydroxyethyl)-2-thiourea, 1-(2-tetrahydrofurfuryl)-2-thiourea, and the like.

Examples of the cysteines include cysteine, cysteine methyl, cysteine ethyl, N-methylcysteine, N-ethylcysteine, N-acetylcysteine, N,N-dimethylcysteine, N,N-diethylcysteine, N,N-diacetylcysteine, glutathione, and the like.

Examples of the ascorbic acids include ascorbic acid, sodium ascorbate, calcium ascorbate, potassium ascorbate, and the like.

Two or more of the above reducing agents may be used in combination.

The content of the reducing agent in the dental composite resin of the present embodiment is preferably 0.001 to 10% by mass, and more preferably 0.01 to 5% by mass.

As the photopolymerization initiator, a ketone compound, an α-diketone compound, a ketal compound, an anthraquinone compound, a thioxanthone compound, a benzoin alkyl ether compound, an acylphosphine oxide compound, and the like, can be used.

Examples of the ketone compound include benzophenone, bis(4-dimethylaminophenyl)ketone, 4,4'-bis(diethylamino)benzophenone, and the like.

Examples of the α-diketone compound include camphorquinone, benzyl, diacetyl, acenaphthenequinone, 9,10-phenanthraquinone, and the like.

Examples of the ketal compound include benzyl ketal, diacetyl ketal, benzyl dimethyl ketal, benzyl diethyl ketal, benzyl bis(β-phenylethyl)ketal, benzyl bis(2-methoxyethyl) ketal, 4,4'-dimethyl(benzyl dimethyl ketal), and the like.

Examples of the anthraquinone compound include anthraquinone, 1-chloroanthraquinone, 2-chloroanthraquinone, 1,2-benzanthraquinone, 1-hydroxyanthraquinone, 1-methylanthraquinone, 2-ethylanthraquinone, 1-bromoanthraquinone, and the like.

Examples of the thioxanthone compound include thioxanthone, 2-isopropylthioxanthone, 2-nitrothioxanthone, 2-methylthioxanthone, 2,4-dimethylthioxanthone, 2,4-diethylthioxanthone, 2,4-diisopropylthioxanthone, 2-chloro-7-trifluoromethylthioxanthone, thioxanthone-10,10-dioxide, thioxanthone-10-oxide, 2-ethylthioxanthone, 2-chlorothioxanthone, 2-hydroxy-3-(3,4-dimethyl-9-oxo-9H-thioxanthen-2-yloxy)-N,N,N-trimethyl-1-propanaminium chloride, and the like.

Examples of the benzoin alkyl ether compound include benzoin methyl ether, benzoin ethyl ether, benzoin propyl ether, benzoin isobutyl ether, and the like.

Examples of the acylphosphine oxide compound include 2,4,6-trimethylbenzoyl diphenyl phosphine oxide, 2,4,6-trimethoxybenzoyl diphenyl phosphine oxide, 2,6-dimethylbenzoyl diphenyl phosphine oxide, 2,6-dimethoxybenzoyl diphenyl phosphine oxide, and the like.

Two or more of the above photopolymerization initiators may be used in combination.

The content of the photopolymerization initiator in the dental composite resin of the present embodiment is preferably 0.001 to 10% by mass, and more preferably 0.01 to 5% by mass.

(Photopolymerization Accelerator)

When the dental composite resin of the present embodiment includes the photopolymerization initiator, the dental composite resin of the present embodiment may further include a photopolymerization accelerator.

Examples of the photopolymerization accelerator include tertiary amines such as N,N-dimethyl-p-toluidine, triethanolamine, tolyl diethanolamine, methyl 4-dimethylaminobenzoate, ethyl 4-dimethylaminobenzoate, isoamyl 4-dimethylaminobenzoate, barbiturates such as barbituric acid, 1,3-dimethylbarbituric acid, 1,3,5-trimethyl barbituric acid, 1,3,5-triethyl barbituric acid, 5-butyl barbituric acid, 1-benzyl-5-phenyl barbituric acid, 1-cyclohexyl-5-ethyl barbituric acid, and the like.

Two or more of the above photopolymerization accelerators may be used in combination.

The content of the photopolymerization accelerator in the dental composite resin of the present embodiment is preferably 0.001 to 5% by mass, and more preferably 0.01 to 1% by mass.

(Filler)

The filler may be either an organic filler or an inorganic filler. The filler is preferably the inorganic filler.

Examples of the inorganic filler include silica powder, alumina powder, glass powder (e.g., barium glass powder, and strontium glass powder), and the like.

The inorganic filler may be treated with a surface treatment agent, such as a silane coupling agent, if necessary.

Two or more of the above fillers may be used in combination.

(Other Components)

The dental composite resin of the present embodiment may further include a polymerization inhibitor, and the like.

Examples of the polymerization inhibitor include dibutyl hydroxytoluene, 2,6-t-butyl-2,4-xylenol, and the like.

Two or more of the above polymerization inhibitors may be used in combination.

The content of the polymerization inhibitor in the dental composite resin of the present embodiment is preferably 0.001 to 1% by mass, and more preferably 0.01 to 0.1% by mass.

EXAMPLE

Hereinafter, examples of the present invention will be described, but the present invention is not limited to the examples.

Monofunctional Monomer Having Antibacterial Group

The following monomers were used as the monofunctional monomers having the antibacterial group.
A: Dimethylaminoethyl methyl chloride methacrylate (Mitsubishi Chemical Corporation)
B: 3-(methacrylamide) propyltrimethylammonium chloride (MCC Unitech)

Polyfunctional Monomer

The following monomers were used as the polyfunctional monomers.
C: Compound represented by the chemical formula (3)
E: Diethylene glycol dimethacrylate (Tokyo Chemical Industry Co., Ltd.)

Monofunctional Monomer Having no Antibacterial Groups

The following monomer was used as the monofunctional monomer having no antibacterial groups.
D: Methoxypolyethylene glycol #400 methacrylate (Shin-Nakamura Chemical Co., Ltd.)

Examples 1 to 10, Comparative Examples 1 to 5

The monomer composition was prepared by blending in the blend amount [% by mass] shown in Table 1. The monomer composition was dissolved in a solvent, and the polymerization initiator was added thereto. Then, the mixture was heated and polymerized under a nitrogen atmosphere while stirring. When a molecular weight of the produced antibacterial polymer exceeded a certain amount, the antibacterial polymer precipitated in the solvent to form the antibacterial polymer particles. The solvent was then removed to give the antibacterial polymer particles.

The polymerization condition was appropriately adjusted so that the water absorption capacity and the median diameter of the antibacterial polymer particles were within the desired values.

Next, the water absorption capacity and the median diameter of the antibacterial polymer particles were measured.

Water Absorption Capacity

Water absorption capacity (g/g) of the antibacterial polymer particles (per unit mass) was measured according to JIS K 7223-1996 of the water absorption capacity testing method for superabsorbent resins.

When a particle size of the antibacterial polymer particles was so small that a significant leakage of the antibacterial polymer particles from a 255 mesh occurred, a 521 mesh was used instead of the 255 mesh.

Deionized water was used as the test solution. The immersion time was 3 hours.

Median Diameter

A laser diffraction/scattering particle size distribution measuring device LA-960V2 dry type measuring unit (HORIBA) was used to measure the median diameter of the antibacterial polymer particles.

Next, the antibacterial activity and the durability of the antibacterial activity of the antibacterial polymer particles were evaluated.

Antibacterial Activity

<Preparation of Test Piece 1>

The monomer composition was prepared by mixing 60 parts by mass of bisphenol A diglycidyl methacrylate, 20 parts by mass of triethylene glycol dimethacrylate, and 20 parts by mass of neopentyl glycol dimethacrylate.

To 100 parts by mass of the monomer composition, 150 parts by mass of the filler (a fluoroaluminosilicate glass filler having a median diameter of 0.4 μm, the surface of which was treated with 3-glycidyloxytrimethoxysilane), 0.2 parts by mass of (±)-camphorquinone, 0.5 parts by mass of 4-(N,N-dimethylamino)ethyl benzoate, and 15 parts by mass of the antibacterial polymer particles were added. The mixture was kneaded in an agate mortar to form a uniform paste, and was defoamed under vacuum to obtain a composite resin.

The composite resin was cured with a dental light irradiator. A test surface of the composite resin was polished with #4000 waterproof abrasive paper to obtain a test piece 1.

<Preparation of Test Piece 2>

95 parts by mass of polypropylene pellet, and 5 parts by mass of the antibacterial polymer particles were mixed at 180° C., then extruded to obtain a test piece 2.

<Evaluation of Antibacterial Activity>

The antibacterial activities of the test pieces 1 and 2 were evaluated according to JIS Z 2801:2012 of the testing method for the antibacterial activity and efficacy.

*S. mutans* was used as a test organism.

As a medium for seeding the test organism on the test pieces 1 and 2, 1/10 BHI medium was used instead of 1/500 broth medium assuming that the medium would exhibit antibacterial activity even under harsher conditions.

The criteria for the antibacterial activity are as follows.

Excellent: The antibacterial activity level is 4 or higher

Good: The antibacterial activity level is 2 or more and less than 4

Bad: The antibacterial activity level is less than 2

[Durability of Antibacterial Activity]

Test pieces 1 and 2 were immersed in neutral phosphate buffer solution for 1 month and then evaluated for the antibacterial activity in the same manner as in the evaluation of the antibacterial activity.

Table 1 shows the results of the evaluation of the antibacterial activity and the durability of the antibacterial activity of the antibacterial polymer particles.

TABLE 1

| | Monofunctional monomer having antibacterial group | | Polyfunctional monomer | | Monofunctional monomer having no antibacterial groups | | Water absorption capacity (g/g) | Median diameter (μm) | Test piece 1 | | Test piece 2 | |
|---|---|---|---|---|---|---|---|---|---|---|---|---|
| | Type | blend amount | Type | blend amount | Type | blend amount | | | anti-bacterial activity | Durability of anti-bacterial activity | anti-bacterial activity | Durability of anti-bacterial activity |
| Example 1 | A | 70 | E | 30 | — | — | 30.9 | 0.5 | Excellent | Excellent | Excellent | Excellent |
| Example 2 | A | 10 | E | 90 | — | — | 4.5 | 0.2 | Good | Excellent | Good | Excellent |
| Example 3 | B | 40 | E | 50 | D | 10 | 20.0 | 50 | Excellent | Excellent | Excellent | Excellent |
| Example 4 | B | 30 | E | 70 | — | — | 5.1 | 25 | Good | Excellent | Good | Excellent |
| Example 5 | B | 40 | E | 60 | — | — | 14.7 | 2 | Good | Excellent | Good | Excellent |
| Example 6 | B | 45 | E | 55 | — | — | 18.0 | 4 | Good | Excellent | Good | Excellent |
| Example 7 | B | 45 | E | 55 | — | — | 13.1 | 100 | Good | Excellent | Good | Excellent |
| Example 8 | A | 5 | E | 95 | — | — | 3.2 | 0.2 | Good | Excellent | Good | Excellent |
| Example 9 | A | 99 | E | 1 | — | — | 102.1 | 80 | Excellent | Excellent | Excellent | Excellent |
| Example 10 | A | 95 | E | 5 | — | — | 84.4 | 1 | Excellent | Excellent | Excellent | Excellent |
| Comparative Example 1 | — | — | C | 30 | — | — | 15.0 | 2 | Bad | — | Bad | — |
| | | | E | 70 | | | | | | | | |
| Comparative Example 2 | A | 40 | E | 50 | D | 10 | 1.0 | 2 | Bad | — | Bad | — |
| Comparative Example 3 | A | 30 | — | — | D | 70 | 11.1 | 2 | Good | Bad | Good | Bad |
| Comparative Example 4 | B | 20 | E | 80 | — | — | 2.0 | 1 | Bad | — | Bad | — |
| Comparative Example 5 | A | 3 | E | 97 | — | — | 0.3 | 0.2 | Bad | — | Bad | — |

According to Table 1, it can be seen that the antibacterial polymer particles of Examples 1 to 10 exhibit high antibacterial activity and high durability of the antibacterial activity.

In contrast, the antibacterial polymer particles of Comparative Example 1 have low antibacterial activity because the antibacterial polymer particles of Comparative Example 1 contain a crosslinked copolymer that does not have the structural unit derived from the monofunctional monomer having the antibacterial group.

The antibacterial polymer particles of Comparative Examples 2, 4 and 5 have low antibacterial activity because the water absorption capacities of the antibacterial polymer particles of Examples 2, 4 and 5 are 0.3 to 2.0 g/g.

The antibacterial polymer particles of Comparative Example 3 have low durability of the antibacterial activity because the antibacterial polymer particles of Comparative Example 3 are composed of non-crosslinked copolymers without the use of polyfunctional monomers during synthesis.

The invention claimed is:

1. An article comprising antibacterial polymer particles, wherein
the antibacterial polymer particles are fixed on a surface of the article,
the antibacterial polymer particles include: a crosslinked copolymer that includes a structural unit derived from a monofunctional monomer having an antibacterial group, and a structural unit derived from a polyfunctional monomer,
a blend amount of the structural unit derived from the monofunctional monomer having the antibacterial group in the crosslinked copolymer is 70% by mass or more and 99% by mass or less,
a water absorption capacity of the antibacterial polymer particles is 30.9 g/g or more, and
the article is at least one of restorations, impressions, denture bases, contact lenses, catheters, implants, wound dressings, stents, cutting boards, toilet seats, or tableware.

2. The article according to claim 1, wherein a median diameter of the antibacterial polymer particles is 0.2 to 110 μm.

3. The article according to claim 1, wherein the monofunctional monomer having the antibacterial group is a compound represented by a general formula (1):

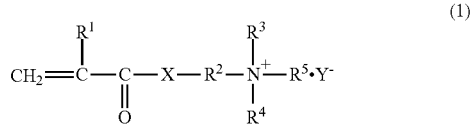

where $R^1$ is a methyl group or a hydrogen atom, X is an oxygen atom or an imino group, $R^2$ is an alkylene group having 1 to 20 carbon atoms, and $R^3$ and $R^4$ are independently alkyl groups having 1 to 3 carbon atoms, $R^5$ is an alkyl group having 1 to 20 carbon atoms, and $Y^-$ is a chloride ion, an iodide ion, a bromide ion, or a methyl sulfate ion.

4. A dental composite resin comprising:
antibacterial polymer particles;
a polymerization initiator; and
a filler, wherein
the antibacterial polymer particles include: a crosslinked copolymer that includes a structural unit derived from a monofunctional monomer having an antibacterial group, and a structural unit derived from a polyfunctional monomer,
a blend amount of the structural unit derived from the monofunctional monomer having the antibacterial group in the crosslinked copolymer is 70% by mass or more and 99% by mass or less, and
a water absorption capacity of the antibacterial polymer particles is 30.9 g/g or more.

5. The dental composite resin according to claim 4, wherein a median diameter of the antibacterial polymer particles is 0.2 to 110 μm.

6. The dental composite resin according to claim 4, wherein the monofunctional monomer having the antibacterial group is a compound represented by a general formula (1):

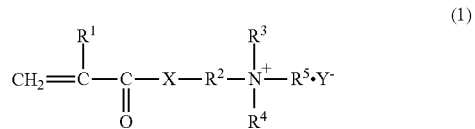

where $R^1$ is a methyl group or a hydrogen atom, X is an oxygen atom or an imino group, $R^2$ is an alkylene group having 1 to 20 carbon atoms, and $R^3$ and $R^4$ are independently alkyl groups having 1 to 3 carbon atoms, $R^5$ is an alkyl group having 1 to 20 carbon atoms, and $Y^-$ is a chloride ion, an iodide ion, a bromide ion, or a methyl sulfate ion.

7. Antibacterial polymer particles comprising:
a crosslinked copolymer that includes a structural unit derived from a monofunctional monomer having an antibacterial group, and a structural unit derived from a polyfunctional monomer, wherein
a blend amount of the structural unit derived from the monofunctional monomer having the antibacterial group in the crosslinked copolymer is 70% by mass or more and 99% by mass or less, and
a water absorption capacity of the antibacterial polymer particles is 30.9 g/g or more.

* * * * *